Inventors
Gerhard Polensky, &
Günter Raab
By [signature] Atty.

Inventors.
Gerhard Polensky &
Günter Raab.
By [signature] Atty.

Inventors.
Gerhard Polensky, &
Günter Raab.
By [signature]
Atty

United States Patent Office 3,453,393

Patented July 1, 1969

3,453,393

CIRCUIT ARRANGEMENT FOR DETERMINING SUBSCRIBER CALL NUMBERS IN TELEPHONE SYSTEMS

Gerhard Polensky and Günter Raab, Munich, Germany, assignors to Siemens Aktiengesellschaft, Munich, Germany, a corporation of Germany Filed Sept. 28, 1962, Ser. No. 227,671
Claims priority, application Germany, Sept. 29, 1961, 376,044, Patent 1,150,417
The portion of the term of the patent subsequent to Apr. 18, 1983, has been disclaimed and dedicated to the Public
Int. Cl. H04m 3/00; H04q 3/72
U.S. Cl. 179—18
5 Claims

ABSTRACT OF THE DISCLOSURE

A circuit arrangement for determining the call numbers of subscribers in telecommunication systems comprising a series of toroidal core evaluation fields, respective connection couplers for connecting the testing loops of a selected evaluation field to a common call number determining means for the series, and respective characterizing cores associated with the return lines of the evaluation loops of the respective evaluation fields, and controlling activation of the appropriate connection coupler so that the call number determining means can scan the testing loops of the evaluation field associated with the active communication line.

Figure 1A:
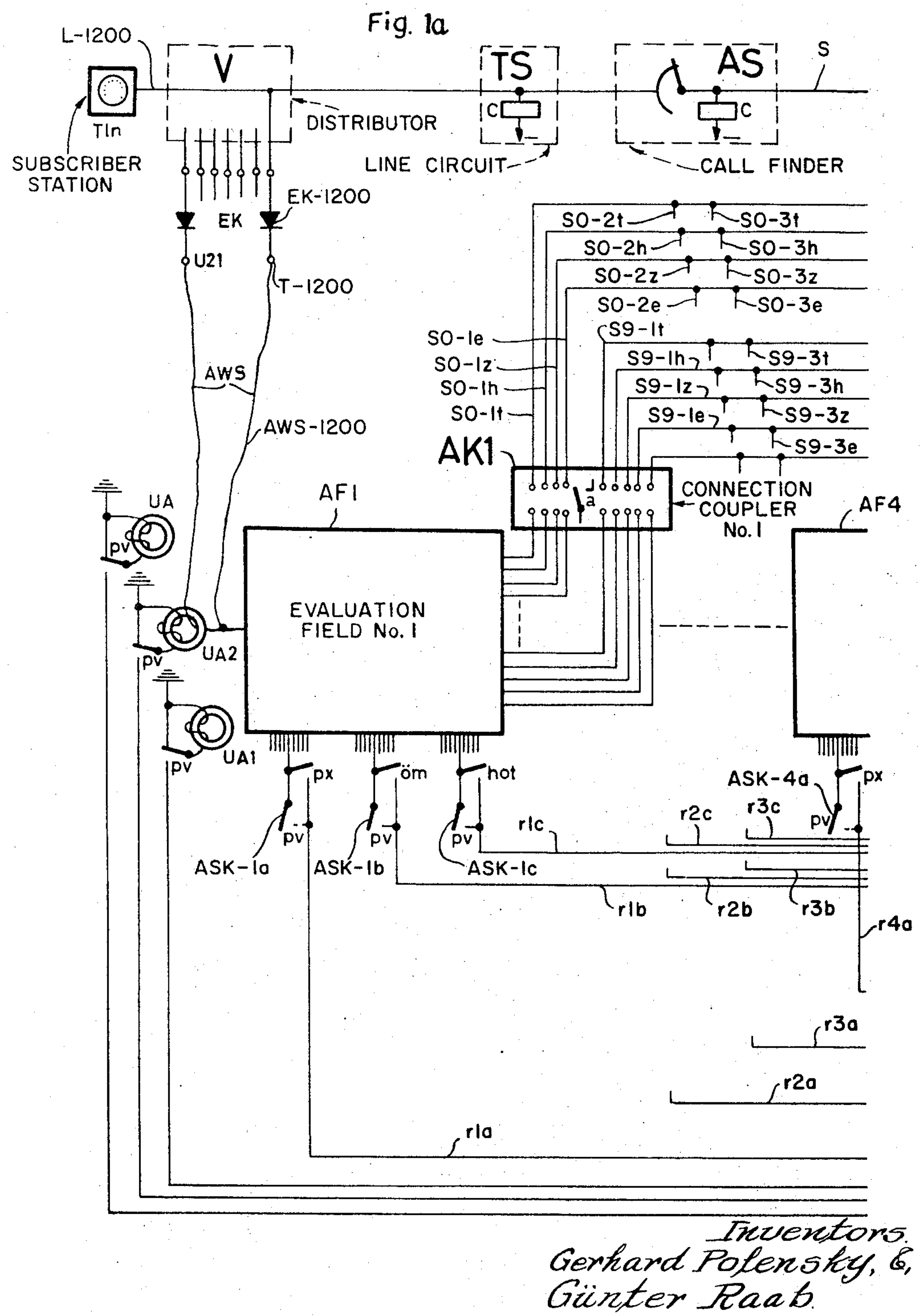

The invention disclosed herein is concerned with determining the call numbers of subscribers in telecommunication systems and particularly in telephone systems.

The determination of call numbers of subscriber stations in telecommunication systems, especially in telephone systems, which is, for example, required for the automatic metering of calls, is generally effected by extending over a connection device disposed in the connection path, for example, an exchange transmission or a metering transmission, a signal to the connection line which signal effects the identification.

In the case of identification devices having, for example, a repeater matrix in the form of a toroidal core evaluation field (such as shown in U.S. Patents 3,256,392, 3,267,216, and 3,271,522), there is always closed, at the identification, over a central signal current source, one of the evaluation loops which characterizes the individual call number. Such repeater matrices generally comprise element columns characterizing the individual decades of call numbers in accordance with the place number corresponding to the longest call number, and a plurality of element lines which characterize or mark the individual digit values per decade. The individual elements in the evaluation fields are ferromagnetic toroidal cores with which the individual evaluation loops are linked by simply being threaded therethrough, whereby the evaluation loop which is respectively affected by an identifying signal energizes a number of toroidal cores corresponding to the place number of the respective call number, such cores characterizing in the various columns, according to their line positions, the digits per call number. It is in this manner possible to form, for example, in a toroidal core evaluation field with three columns and ten lines, a total of one thousand definitely distinguishable core combinations corresponding to three-place call numbers.

The signal current circuit extending during the identification operation over an evaluation loop generally includes the connection path in which the identification signal is switched to the connection line in the connection device disposed in the connection path while the evaluation loop is in the subscriber line circuit connected to the connection line. Depending upon the connection of the signal generator, the evaluation loop can thereby be connected to the two line conductors of the line or only to one conductor, with a common return to the signal generator, for example, over a ground return.

The fabrication of toroidal core evaluation fields, especially those in which the evaluation loops are prefabricated, is from the point of view of production technique, quite simple. However, a disadvantage resides in that the maximum number of evaluation loops that can be carried through one toroidal core depends upon the inner diameter of the cores. Accordingly, in order to do with minimum space requirement at any size of toroidal core fields, it would be necessary to provide toroidal cores of different size which is, however, a disadvantage so far as the operation is concerned.

It would therefore seem feasible to produce identification devices with relatively small toroidal core evaluation fields and to connect a plurality of such identification devices in parallel according to prevailing requirements. However, the expenditures in connection with such identification assemblies, composed of a plurality of relatively small identification devices, would be quite considerable.

The invention shows a way for reducing the expenditures in connection with such identification devices which are composed of a plurality of toroidal core evaluation fields. This is accomplished by subdividing the evaluation loops into groups, allocating to each group an individual evaluation field and providing for the entire number of toroidal core evaluation fields merely one set of signal receivers such as would normally be required for one toroidal core evaluation field, and determining the respective toroidal core evaluation field, which is in any case to be operatively connected, by the signal receivers in the testing proper of a connected toroidal core evaluation field by preceding testing steps which respectively characterize a connection operation of the signal receivers. The expenditure, so far as the testing and control devices are concerned, thus remains substantially limited to those which would be required for a single toroidal core evaluation field. Merely auxiliary connecting members need be provided in the case of a plurality of evaluation fields.

According to another feature of the invention, the set of signal receivers, which is common to all toroidal core evaluation fields, can be used for determining the service type of the connection lines which are respectively to be identified, for example, sub exchange lines, private or individual lines, coin stations, hotel or private branch exchange lines, etc.

In order to avoid undue prolongation of the identification operation, it is proposed to simultaneously carry out, in a single testing step, the determination of the respective toroidal core evaluation field which is to be connected and also the determination of the service type of the respective line which is to be identified.

Toroidal cores are most suitable as characterizing switching means in view of the available signal receivers, since such cores can be included in the circuit in a most simple manner.

There are several possibilities so far as the insertion of the individual characterizing cores in existing circuits is concerned. Thus, the characterizing cores for the determination of the respective toroidal core evaluation field which is to be connected, may be part of each toroidal evaluation field, for example, in the case of toroidal core evaluation fields each with two thousand evaluation loops in which are provided in the thousands decade two toroidal cores for each of the two possible digits, by testing these cores during the testing step or steps preceding the identification proper.

Another possibility, which also enables reduction of the number of testing steps for the pre-exclusion, especially in connection with a plurality of toroidal core evaluation fields, resides in allocating to each toroidal core evaluation field an individual toroidal core which is connected with each toroidal core of the highest incomplete decade of each toroidal core evaluation field over several separate or over a common coupling loop which is operatively effective only during the testing. The remaining signal receivers are thus available for the determination of the service type of the connection line.

Another simple possibility for the insertion of the characterizing cores resides, in the case of toroidal core evaluation fields with common return line for the evaluation loops to the signal generator, in conducting these return lines through a characterizing core. The same applies for the characterizing cores for determining the service type of the respective lines which are to be identified, thereby avoiding the necessity of conducting through the respective characterizing core all evaluation loops of identical line type.

The connection of the signal receiver can be effected by providing for each toroidal core evaluation field a connection chain required for the readout control, while utilizing a simple coupling relay or likewise a further connection chain, for the pre-exclusion, depending upon the number of the required testing steps.

According to a further feature of the invention, there is another possibility for reducing the expenditure for connection members, which resides in effecting the connection of the available signal receivers for the pre-exclusion depending upon the kind and location of the connection line which is to be identified, by a single connection chain, which is normally allocated to each toroidal core evaluation field, while carrying out the connection of the respective toroidal core evaluation field which is to be tested, by a connection coupler in cooperation with the common connection chain.

Only one single connection chain is in this manner required which is, as compared with the normally required connection chain, merely enlarged by the number of switching steps which corresponds to the number of testing steps required for the pre-exclusion, such connection chain taking over the readout control, while the connection of the individual toroidal core evaluation fields to the common readout lines of the connection chain is effected by contacts of individual coupling relays.

The invention will now be described with reference to the accompanying drawings showing an embodiment thereof. Only those switching elements are represented in the drawings which are important for the understanding of the invention and the general operation thereof.

Figure 1B:
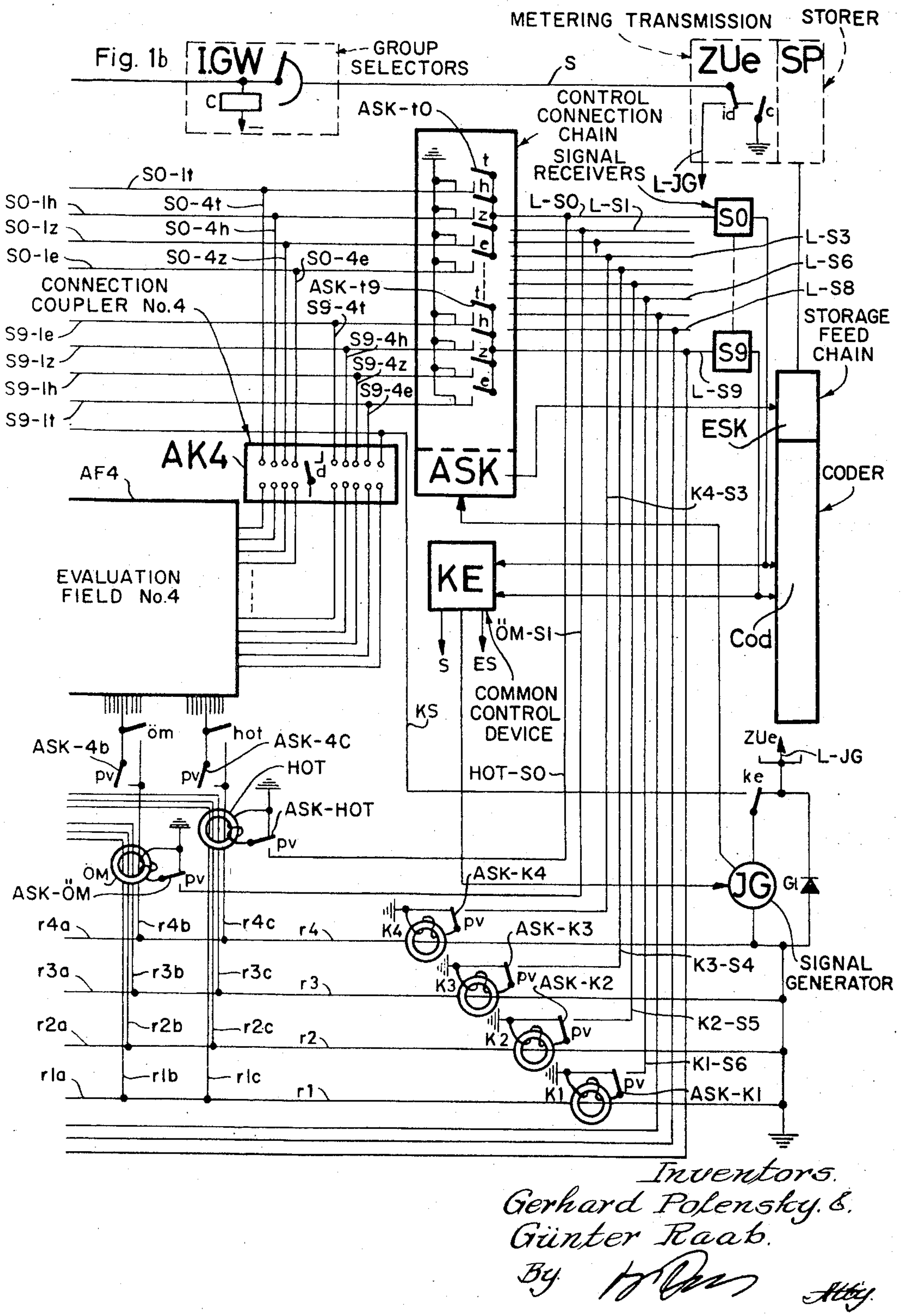
Figure 2:
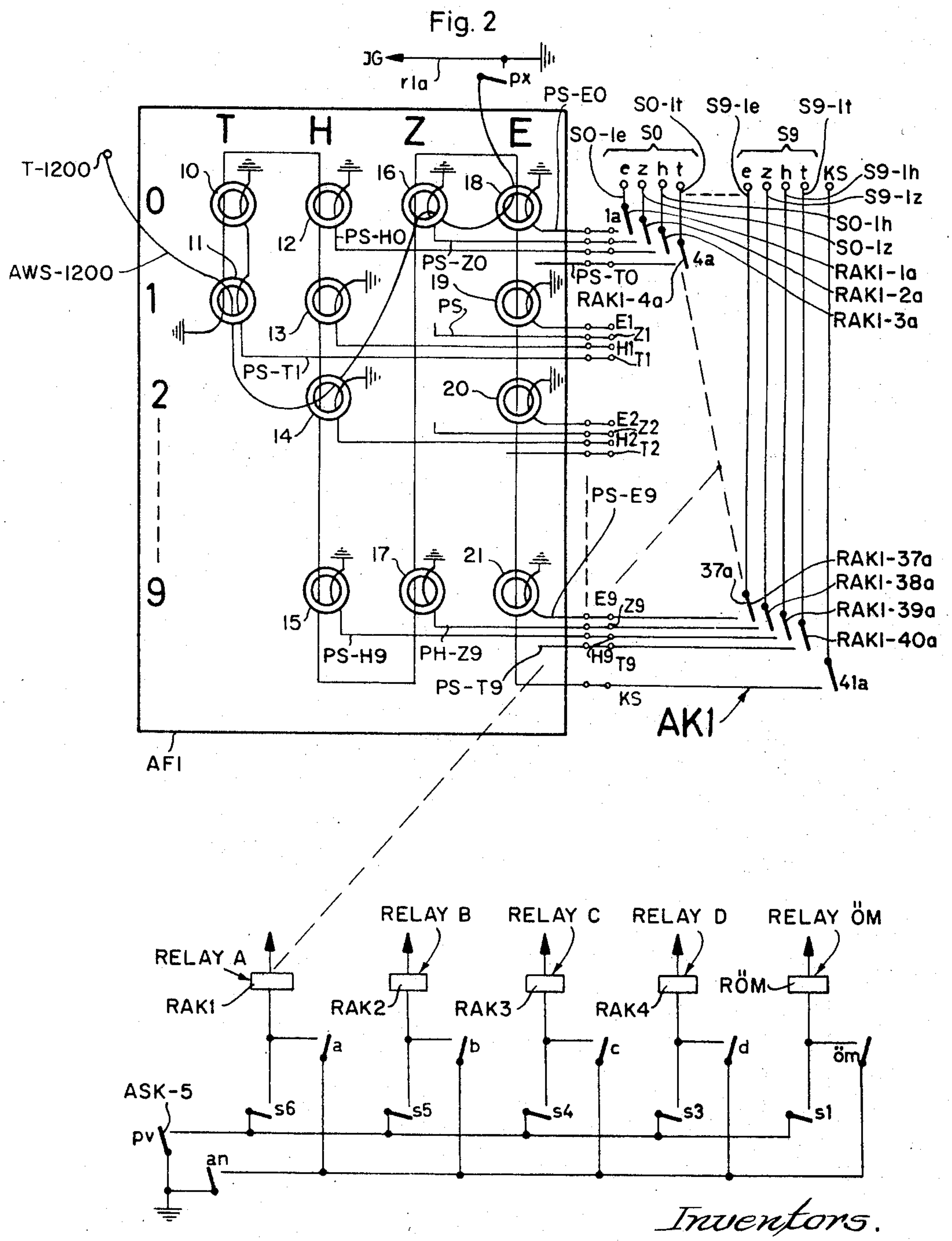

FIGS. 1*a* and 1*b* (collectively referred to as FIG. 1) show an overall circuit of an identification device; and FIG. 2 shows details of a toroidal core evaluation field.

The identification device shown in FIG. 1 is provided with four toroidal core evaluation fields AF1 to AF4, in connection with a system with a private conductor *s*, also referred to as *c*-conductor, which is switched through over all selection stages, and having a return line to the signal generator JG, which return line is common to the evaluation loops AWS.

The operative connection of the signal generator JG, which is, for example, constructed as an impulse generator, is effected in the metering transmission ZU*e*. The signal current circuit then extends further over the group selectors I.GW and the call finder AS, disposed in the connection path, and thence to the distributor V, at which all connection lines, which are identifiable, are combined, such distributor being therefore most suitable for the connection of the evaluation loops AWS. The signal current circuit extends over the evaluation loops AWS with the individual decoupling elements EK and one of the four toroidal core evaluation fields AF1 to AF4, as well as over a contact such as *px*, *öm* or *hot*, back to the impulse generator JG.

In the return lines *r*1 to *r*4 of the individual core evaluation fields AF1 to AF4 are disposed the characterizing cores K1 to K4 for the determination of the respective toroidal core evaluation field which is to be operatively connected.

The contacts *px*, *öm* and *hot* serve for the connection of the evaluation loops which are in each respective toroidal core evaluation field combined in groups in accordance with the service type of the corresponding connection lines. The contact *px* designates the private lines. In the case of party lines, the customary order contacts *p*1 to *p*0 may take the place of the contact *px*, the relays governing the actuation of these order contacts being in known manner energized at the initiation of a call by the corresponding subscriber or being energized responsive to the automatically transmitted order number which marks the connection on the party line. The individual private connections are appropriately uniformly distributed with respect to all order contacts. The contacts *öm* characterize or mark connections extended from public pay stations and the contacts *hot* mark connections extended from hotels. For the characterizing of the two last named types of connections, there are provided characterizing cores ÖM and HOT, through which are threaded the common return lines *r*1 to *r*4, coming from the respective connection groups of the individual toroidal core evaluation fields and extending to all evaluation loops of a toroidal core evaluation field.

The characterizing cores UA, UA1 and UA2 characterize or mark connections from sub exchanges with different significance, the evaluation loops of sub exchange transmissions leading to sub exchanges without individual identification device being threaded through the toroidal core UA, and those from sub exchanges with individual identification device being threaded through the cores UA1 and UA2. The digits 1 and 2 of the two last named characterizing cores also mark, according to another proposed arrangement (found in U.S. Patent 3,267,216), the number of the digits required for the determination of the respectively applying sub exchange code number, thus, for example, the core UA1 marking one-place code numbers and the core UA2 marking two-place code numbers.

The operative connection of the central signal receivers S0 to S9 is likewise controlled by the control connection chain ASK, which chain can be constructed as a relay chain or as a rotary switch with a plurality of wipers. References *pv*, *t*, *h*, *z* and *e* designate contacts of the connection chain, contracts *pv* marking the testing step, in the pre-exclusion operation, for determining the connection type and the location of the respectively associated evaluation loop in one of the four toroidal core evaluation fields, and the contacts *t*, *h*, *z* and *e* marking in the determination of the call numbers the first, second, third and last testing step.

All characterizing cores are in normal or resting condition short-circuited over the contacts *pv*, being thus operationally disabled. The same applies to the toroidal cores of the respective operationally connected toroidal core evaluation field, such cores being short-circuited by the contacts *t*, *h*, *z* and *e* so as to avoid couplings of the evaluation loops each with respect to the others. The connection couplers AK1 to AK4 serve for the selective connection of the toroidal core evaluation fields to the testing lines which are common to all toroidal core evaluation fields and extend to the signal receivers.

FIG. 1 also shows a common control device KE for testing the results recorded by the signal receivers, a coder *Cod* and a storage feed chain ESK feeding of the call number digits into the storer SP which may, for example, be continuously allocated to the metering transmission ZU*e*.

FIG. 2 shows in its upper part a toroidal core evaluation field AF1 with the connection coupler AK and in the lower part thereof the triggering of all connection couplers which are represented as simple relays A to D. The toroidal core evaluation field comprises four toroidal core columns T, H, Z and E, corresponding to thousands, hundreds, tens and units digits of a call number, for example, the number 1200. The columns H, Z and E comprise respectively ten toroidal cores corresponding to the ten different digit values zero (0) to nine (9) per decade. An individual testing loop PS is provided for each of these toroidal cores, forming the secondary winding of the respective cores, such testing loops extending respectively to similarly reference terminals E0 to E9, Z0 to Z9 and H0 to H9, to which are connected over contacts 1*a* to 40*a* the testing lines leading to the signal receivers S0 to S9. The core column T is as compared with the remaining core columns incompletely circuited. It comprises, for example, only four cores, two cores thereof always representing, in accordance with an evaluation field with a total of two thousand evaluation loops, one and the same digit. Each of these pairs of toroidal cores lies in an individual testing loop which is extended to the terminal corresponding to the respective digit, for example, digit 1, in such case, to the terminal T1. All of the remaining terminals T . . . are not circuited.

The connection coupler AK operates as follows:

As soon as the connection chain ASK has at the testing step of the pre-exclusion closed its contacts *pv* and a signal has been registered at one of the signal receivers S6 to S3 which are connected with the characterizing cores K1 to K4, there will be completed a circuit extending from ground, *pv*, *s*6, A, to battery (—), in which circuit the relay A can energize, thereby closing its contact *a* in a holding circuit and its contacts 1*a* to 41*a* connecting the core field AF1 with the common signal receivers.

In conclusion, the operation of the entire identification device shall now be briefly described:

Upon seizure of the metering transmision ZU*e* by a calling subscriber station T*ln*, there is energized a seizure or private relay C (not shown) of the metering transmission, such relay closing its contact *c* and thus placing ground on the incoming control or private conductor *s*, thereby maintaining the extension of the call from the calling station, for example, *Tln*1200, to the metering transmission ZU*e*, until the identification device is available, at which time it is placed in operation and contact *id* thereof connects the impulse generator JG to the private conductor *s* over which the signal current is conducted during the identification operation.

The connection chain ASK is controlled, for example, by the impulse generator JG which is triggered by the metering of transmission at the start of the identification operation, while the further impulse transmission is governed by the control device KE. The first control impulse acting in the connection chain ASK causes by the actuation of contacts *pv* which are operated incident to the first switching step, the operative release of the characterizing cores UA, UA1, UA2, K1 to K4, ÖM and HOT.

The result registered by the operatively connected signal receivers S0 to S9 is conducted to the control device. If the result is definite, that is, one of the characterizing cores K1 to K4 and in given cases one of the remaining characterizing cores, have been energized, the impulse generator is triggered for the delivery of the next control impulse and such impulse effects stepping ahead of the connection chain to the next switching step *t*.

The signal receiver, for example, S6, which is connected with the energized characterizing core serving for the determination of the respective toroidal core evaluation field which is to be operatively connected, effects, in the manner already explained, the connection of the respectively associated connection coupler AK1 which is identical with the relay A shown in the lower part of FIG. 2, and the contacts 1*a* to 40*a* of which connect the testing loops of the corresponding toroidal core evaluation field AF1 with the testing lines extending to the signal receivers.

In case another one of the remaining signal receivers, for example, the signal receiver S1 which is connected with the characterizing core ÖM, has also registered a result, the relay ÖM is operatively connected over a contact *s*1 of such relay, which relay closes a holding circuit for itself extending over its contact *öm*, the relay ÖM maintaining over further contacts *öm*, after stepping ahead of the connection chain to the switching step *t*, the through connection of the respective evaluation group to one of the common return lines, for example, line *r*1 which corresponds the evaluation field AF1.

Control operations which are of interest in connection with the identification operations can likewise be operatively released by further contacts actuated by the relay ÖM. The same applies for the remaining characterizing relays (not illustrated).

The testing operation proper, for the determination of the call number, starts with the triggering of the connection chain to the switching step *t*. Each obtained result is from now on conducted respectively over the coder *Cod* to the storer SP and to the control device KE. The setting of the control chain ESK, for the digit-true extension to the storer, is effected coincident with the operative connection of the connection chain ASK. If the result registered by the signal receiver is definite—only one signal receiver has registered a result—there is effected by the control device KE, the switching over of the connection chain to the next impulse step.

DESCRIPTION OF THE DETAILS OF THE ILLUSTRATED CIRCUIT

In order to provide a written description of the details of the illustrated circuit, various of the generically designated components of FIGURES 1 and 2 have been given additional individual reference characters where they are referred to hereinafter. The generic reference characters facilitate a comprehension of the drawings, while the individual reference characters will facilitate the written description of the circuit.

In FIGURE 2, the evaluation field AF1 is shown as comprising a number of columns of transformer elements such as those specifically illustrated at 10 through 21. The columns are indicated by reference letters T, H, Z and E and the number of columns corresponds to the number of places of the call number to be identified. Thus, if the communication line L–1200, FIG. 1*a*, is assigned the call number 1200, then the corresponding evaluation loop AWS–1200 is coupled to cores 11, 14, 16 and 18 as illustrated in FIG. 2.

The present invention reduces the expenditures in connection with the identification of communication lines such as L–1200. This is accomplished by sub-dividing the evaluation loops AWS into groups, allocating to each group an individual evaluation field and providing for the entire number of toroidal core evaluation fields merely one set of signal receivers S0 through S9, such as would normally be required for one toroidal core evaluation field. The expenditure, so far as the testing and control devices are concerned, thus remains substantially limited to that which is required for a single toroidal core evaluation field. It is merely necessary to provide auxiliary connecting members AK1 through AK4 in the case of a plurality of evaluation fields AF1 through AF4.

According to another feature of the invention, the set of signal receivers S0 through S9, which is common to all of the toroidal core evaluation fields AF1 through AF4, can be used for determining the service type of the connection lines such as L–1200 which are respectively to be identified. In order to avoid undue prolongation of the identification operation, it is proposed to simultaneously carry out, in a single testing step, the determination of the respective toroidal core evaluation field which is to be connected, that is which of the connection couplers AK1 through AK4 is to be operated to circuit completing condition, and also the determination of the service type of the respective line such as L–1200 which is to be identified.

According to a further feature of the invention, only one single connection chain ASK, FIGURE 1*b*, is required which is, as compared with the normally required connection chain, merely enlarged by the number of switching steps (such as step *pv*) which corresponds to the pre-exclusion operation, while the connection of the individual toroidal core evaluation fields to the common readout lines L–S0 through L–S9 (via contacts such as ASK–*t*0 of the connection chain ASK) is effected via the contacts of the individual connection couplers AK1 through AK4.

The operative connection of the signal generator JG, FIG. 1*b*, with the conductor *s* is effected via a conductor L–JG. The signal current circuit then extends to the distributor V, FIG. 1*a*, at which all connection lines which are identifiable, such as L–1200, are combined, such distributor V being therefore most suitable for the connection of the evaluation loops such as AWS–1200. The signal current circuit extends over the evaluation loops such as AWS–1200 via individual coupling elements such as EK–1200 and one of the four toroidal core evaluation fields such as AF1.

The return lines of the individual toroidal core evaluation fields AF1 through AF4 are designated *r*1*a*, *r*1*b*, *r*1*c* through *r*4*a*, *r*4*b*, *r*4*c*. The return lines from the respective evaluation fields AF1 through AF4 connect with respective common return conductors *r*1 through *r*4, FIG. 1*b*. As illustrated in FIG. 1*b*, return lines *r*1*b* through *r*4*b* are threaded through subgroup characterizing core ÖM and return lines *r*1*c* through *r*4*c* are threaded through subgroup characterizing core HOT.

Thus with the *pv* contacts closed, such as the contacts specifically designated ASK–1*a*, ASK–1*b*, ASK–1*c* through ASK–4*a*, ASK–4*b* and ASK–4*c* (associated with the return lines of the evaluation fields AF1 through AF4, FIG. 1), ASK–*öm* (adjacent toroidal core ÖM, FIG. 1*b*) and ASK–*hot* (adjacent toroidal core HOT, FIG. 1*b*), and ASK–K1 through ASK–K4 (associated with toroidal cores K1 through K4, FIG. 1*b*), it will be observed that there is a complete circuit from the signal generator JG, FIG. 1*b*, via conductor L–JG, conductor *s*, evaluation loop AWS–1200, contact ASK–1*a*, FIG. 1*a* (compare FIG. 2 showing AWS–1200), return line R1*a*, and characterizing core K1, FIG. 1*b*. For the case of an evaluation loop belonging to a subgroup connected with contact ASK–1*b*, the circuit would extend via return line *r*1*b* and through subgroup characterizing core ÖM to return line *r*1 and again through characterizing core K1. Similarly, if the evaluation loop belongs to the subgroup which is connected with contact ASK–1*c*, the circuit would extend via return line *r*1*c* and through characterizing core HOT and through characterizing core K1. Thus, in each event, the characterizing core K1 would be activated so as to transmit a signal via contact ASK–*k*1 and conductor *k*1–*s*6 to the common readout line or output line L–S6 of connection chain ASK.

As soon as the connection chain ASK has closed its contacts *pv* (to scan the condition of toroidal cores such as HOT, ÖM, and K1 through K4), and a signal has been registered at one of the signal readout lines such as L–S6 (where toroidal core K1 is activated), the corresponding contact *s*6 in FIG. 2 (at the lower left) is closed to complete a circuit extending from ground through *pv* contact ASK–5, contact *s*6 and the energizing coil RAK1 of relay A.

If characterizing core ÖM is also actuated, a signal is transmitted therefrom via contact ASK–*öm* and conductor *öm*–*s*1 to the common output line L–S1. This would result in the closure of contact *s*1 at the lower right of FIG. 2 so that the energizing coil RÖM would also be energized.

The signal readout line, for example line L–S6, which is connected with the characterizing core K1 (via *k*1–*s*6, FIG. 1*b*) effects the operation of the respectively associated connection coupler AK1 (which is identical with the relay A shown in the lower part of FIG. 2) to circuit completing condition. The contacts RAK1–1*a* through RAK1–40*a* of coupler AK1 connect the testing loops PS–E0, PS–Z0, PS–H0, PS–T0 through PS–E9, PS–Z9, PS–H9, PS–T9 of the corresponding core evaluation field AF1 with the sets of testing lines S0–1*e*, S0–1*z*, S0–1*h*, S0–1*t* through S9–1*e*, S9–1*z*, S9–1*h*, S9–1*t*, which sets of testing lines are connectible via contacts *e*, *z*, *h* and *t* of connection chain ASK with the readout lines L–S0 through L–S9.

After one of the characterizing relay coils RAK1 through RAK4 has been energized to actuate the corresponding set of contacts (such as RAK1–1*a* through RAK1–40*a*, FIG. 2) of connection couplers AK1 through AK4, respectively, the testing or scanning operation proper, for the determination of the call number of the communication line, such as L–1200, starts with the triggering of the connection chain ASK to the switching step *t* whereupon contacts such as ASK–*t*0 through ASK–*t*9 are closed. With the *t* contacts of ASK closed, a signal will be transmitted for the case of communication line L–1200, via testing loop PS–T1, FIG. 2, to terminal T1 and via coupler AK1 to the testing line (not shown) which would be designated S1–1*t* using the notation of FIG. 2. This testing line would connect with a terminal of connection chain ASK (not shown) which would be designated specifically ASK–*t*1, and this contact in turn would be connected to the common output line L–S1. Thus the signal pattern on the readout lines L–S0 through L–S9 of the connection chain ASK (during the scanning of column T of AF1) would represent the fact that the active evaluation loop AWS–1200 was coupled with transformer element 11, FIG. 2, and that the digit in the thousands place of the call number was the digit "one."

Similarly with the connection chain in the *h* position (for effecting the scanning of column H of AF1) a signal would be transmitted to output line L–S2 signifying that the evaluation loop AWS–1200 is coupled with core 14 of FIG. 2 representing the digit "2" in the hundreds place of the call number. For cores 16 and 18 as illustrated in FIG. 2, output signals would appear (during scanning of columns Z and E) on the readout line L–S0 of connection chain ASK indicating the digit "0" in the tens and units places of the call number associated with loop AWS–1200.

Changes may be made within the scope and spirit of the appended claims which define what is believed to be new and desired to have protected by Letters Patent.

We claim:

1. A circuit arrangement for sensing call numbers of communication lines in communication installations comprising a series of evaluation fields, each evaluation field comprising transformer elements arranged in a number of columns corresponding to the number of places of the call numbers to be determined, the evaluation fields having respective groups of evaluation loops coupled therewith corresponding to respective different groups of said communication lines, with each evaluation loop being coupled with respective transformer elements of the successive columns in accordance with the successive digits of the call number of the corresponding communication line, and each transformer element having a testing loop coupled therewith for sensing the activation of any of the evaluation loops associated therewith, respective connection couplers connected with the testing loops of respective ones of said evaluation fields, and being selectively operable to circuit completing condition, respective characterizing means controlling the selective operation of the respective connection couplers, and each connectible to the evaluation loops of one of said evaluation fields and respectively actuatable in response to the presence of an active evaluation loop in the respective evaluation fields to effect operation of the corresponding connection coupler to circuit completing condition, and common connection means connected with said connection couplers for selective connection with the respective evaluation fields, said common connection means being operable to scan the testing loops of the one of said evaluations fields which has its connection coupler in circuit completing condition to sense the call number of the communication line giving rise to the activated evaluation loop.

2. A circuit arrangement according to claim 1 with said evaluation fields each having respective subgroups of evaluation loops corresponding to respective different types of connecting lines to be identified, subgroup characterizing members connectible to the respective subgroups of evaluation lines of a given type for identifying the type of subgroup, and said common connection means having common readout lines and being connected with said subgroup characterizing members and being sequentially operable first to connect said subgroup characterizing members with respective ones of said common output lines to scan the condition thereof, and then to connect with the testing loops of the successive columns of transformer elements to determine the successive digits of the call number of the activated evaluation loop.

3. A circuit arrangement according to claim 2 with said characterizing means comprising respective evaluation field characterizing members connectible with all of the evaluation loops of respective ones of the evaluation fields, and said common connection means being operable to simultaneously connect said evaluation field characterizing members and said subgroup characterizing members with respective ones of said common readout lines for simultaneous determination of the evaluation field to be selected and of the type of connecting line being serviced.

4. A circuit arrangement according to claim 3 with said evaluation field characterizing members and said subgroup characterizing members comprising toroidal cores having means for coupling respective ones thereof with the evaluation loops of the respective evaluation fields and with the respective subgroups of evaluation loops, and having respective output loops selectively connectible with respective ones of said readout lines under the control of said common connection means.

5. A circuit arrangement according to claim 4 with the evaluation fields having return lines connected with the respective subgroups of evaluation loops of each evaluation field, each evaluation field characterizing toroidal core being coupled with all of the return lines from one of the evaluation fields, and each subgroup characterizing toroidal core being coupled with the return lines from the respective evaluation fields corresponding to one type of said communication lines.

References Cited

UNITED STATES PATENTS

| | | | |
|---|---|---|---|
| 2,843,838 | 7/1958 | Abbott | 179—18 X |
| 2,955,166 | 10/1960 | McCreary. | |
| 2,960,682 | 11/1960 | French. | |
| 2,965,883 | 12/1960 | Miller. | |
| 3,047,840 | 7/1962 | Harms et al. | 179—18 X |

WILLIAM C. COOPER, *Primary Examiner.*

U.S. Cl. X.R.

340—166